July 26, 1949.　　　　　L. TALBOT　　　　　2,477,319
WELDING CLAMP UNIT

Filed Aug. 15, 1946　　　　　　　　　　　　2 Sheets-Sheet 1

INVENTOR.
Lloyd Talbot
BY
Archibald D. McKellar
Attorney

July 26, 1949.     L. TALBOT     2,477,319
WELDING CLAMP UNIT
Filed Aug. 15, 1946     2 Sheets-Sheet 2
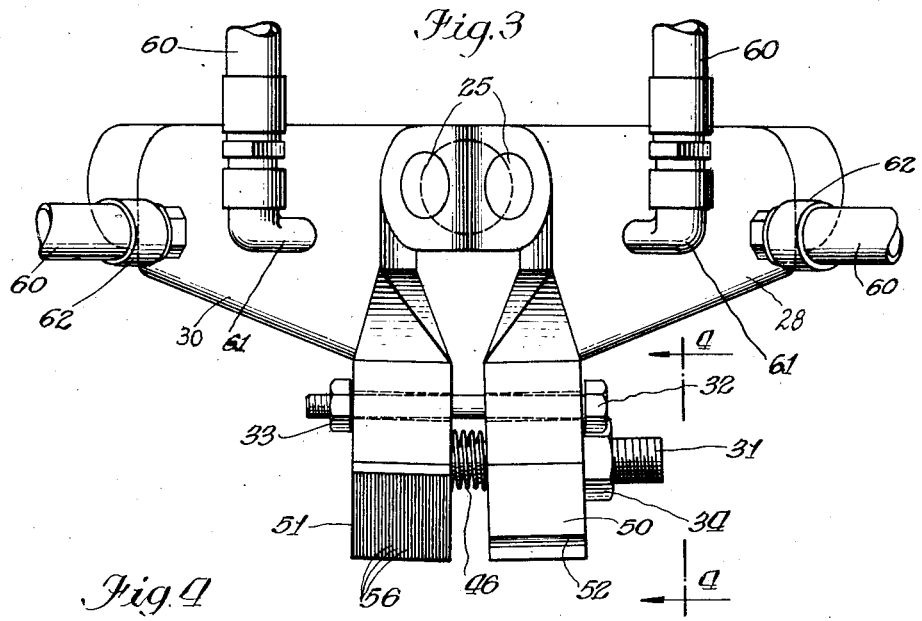
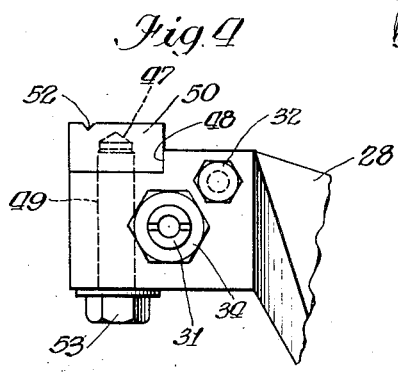
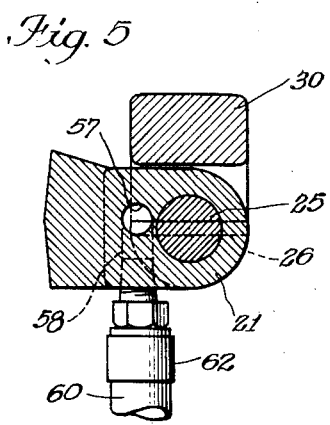
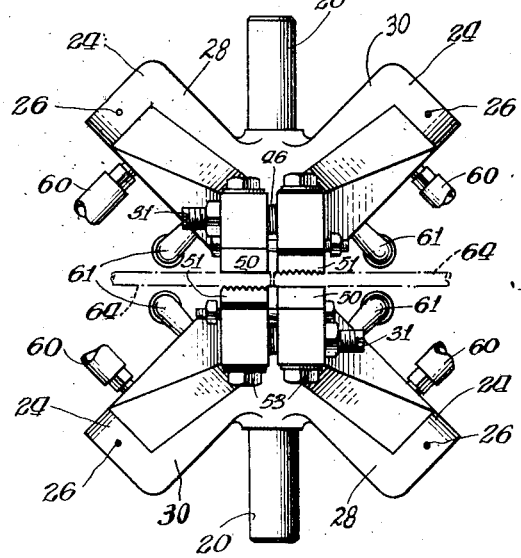
INVENTOR.
Lloyd Talbot.
BY Archibald D. McKellar
Attorney.

Patented July 26, 1949

2,477,319

UNITED STATES PATENT OFFICE 2,477,319

WELDING CLAMP UNIT

Lloyd Talbot, Chicago, Ill., assignor to Robert H. Hoffman, Chicago, Ill.

Application August 15, 1946, Serial No. 690,620

11 Claims. (Cl. 219—4)

The invention concerns attachments for welding machines, especially those having projecting electrodes or horns, but relates particularly to devices of this character which serve to hold securely the article or parts to be welded, but more so to devices of this character where all necessary movable parts are arranged in close proximity; and has for its objects the provision of a device of this kind which will be co-acting when moved in gripping position, simple of construction and operation, economical to manufacture and highly efficient in use.

Other objects will appear hereinafter.

The invention consists of the combinations and arrangements of parts hereinafter described and claimed.

The invention will be best understood by reference to the accompanying drawings forming a part of this specification, and in which Figure 1 is a perspective view of a fragmentary part of a conventional welding machine having outwardly projecting horn electrodes equipped with welding clamps embodying the invention as arranged for use;

Figure 3 is a plan view of the gripping face of each of said clamp members;

Figure 4 is a section taken on line 4—4 of Figure 3;

Figure 5 is a section taken on line 5—5 of Figure 2; and

Figure 6 is a front view of the clamp members in closed position.

Figure 1:
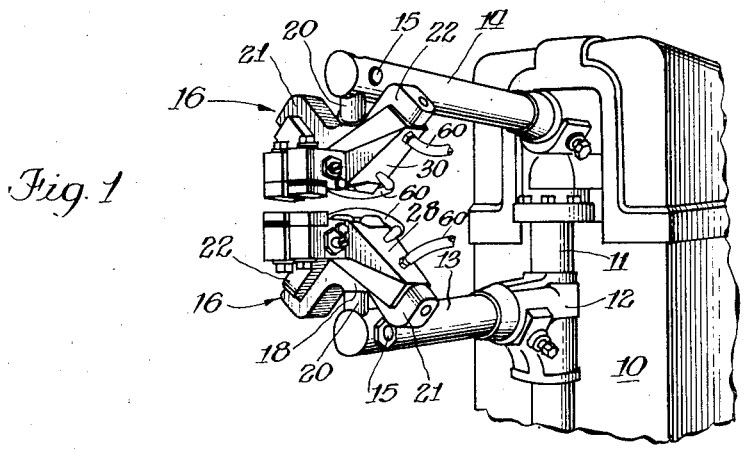

The illustration of the invention as arranged for use and shown in perspective in Figure 1 comprises a spot welding machine of a conventional type having a housing 10 with a vertical shaft 11 arranged forwardly of the front thereof, and on which is slidably mounted a vertically adjusted carriage 12 supporting an outwardly extending copper electrode 13. A cooperating electrode 14 is arranged co-extensively directly above the electrode 13, and is adapted to swing its outer end in vertical alignment therewith from a pivotal mounting within said housing 10. Each electrode 13 and 14 is provided with a vertically arranged hole adjacent its outer end, adapted to receive the shank of an attachment, and also a horizontally arranged hole adjacent to the first hole, into which is placed a suitable bolt 15 which, when tightened, tends to distort the vertical hole and grip the shank of an attachment.

The embodiment of the invention comprises a pair of identical units 16—16 which, when in use, are arranged in reverse position, one being mounted on the lower electrode 13 and projecting upwardly, and the other mounted on the upper electrode 14 and projecting downwardly, as best shown in Figure 1.

Figure 2:
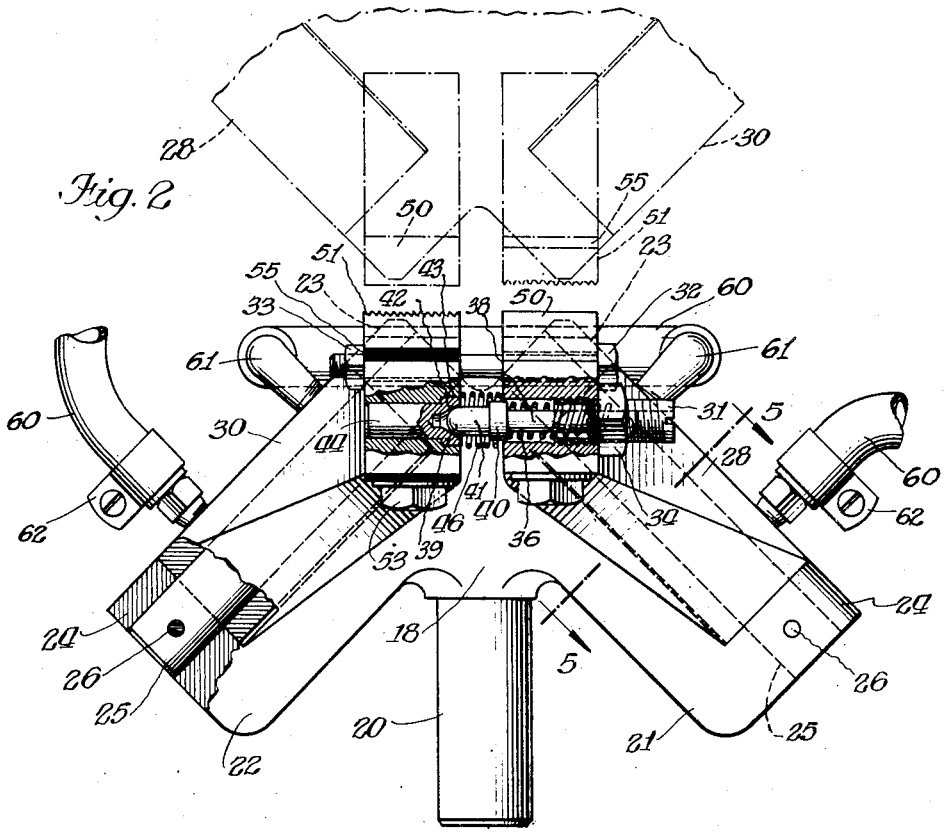
Figure 2 is a face view of said clamp members and a fragmentary view of its companion arranged in neutral position, as shown in dotted line.

Referring to Figure 2, each unit 16 comprises an integrally formed body 18 having a shank 20, adapted to fit the mounting hole of either of the electrodes 13 or 14, and two arms 21 and 22 projecting outwardly in the same vertical plane from opposite sides of the shank 20, each arm being in the same angular relation to the axial line of the shank 20. Both of the arms 21 and 22 have laterally projecting outer lugs 23 and inner lugs 24 with suitably aligned holes through which are mounted suitable hinge pins 25. The hinge pins 25 are rigidly held in place by frictionally held drive pins 26 mounted in cooperatively aligned holes through the pins 25 and the lugs 23 and 24 respectively. Cooperating companion jaw members 28 and 30 are hingedly mounted on the hinge pins 25 as shown in Figures 2 and 6, and project forwardly and convergingly from said body 18 at substantially the front thereof. By this arrangement the companion jaw members 28 and 30 are adapted to swing their outwardly projecting ends in variably spaced and horizontally aligned juxtaposition. The companion jaw members 28 and 30 are each provided near its forward end with a hole in cooperative alignment, through which is inserted a suitable bolt 32 carrying a nut 33 by which the horizontal movement may be outwardly regulated.

Adjacent the bolt 32 are other cooperatively aligned holes through the said jaw members 28 and 30, that in the jaw member 28 being provided with an internal thread at its outer portion adapted to receive the end of a threaded adjusting screw 31 and which is adjustably and securely held by a nut 34 frictionally mounted thereon. The screw 31 is provided with a tubular recess 35 at its inner end adapted to form a seat for the expansion coil spring 36. A guide pin 38 having a cylindrical body is arranged within the coil spring 36 and is provided with a head 40 slidably fitting the inner end of the hole in member 28 and which serves as the companion seat for the coil spring 36. The head 40 of the guide pin 38 is further provided with a projecting stud 41 having a ball pointed end 39 arranged and adapted to bear against a conical seat 42 in the head 43 of a companion guide pin 44, which is mounted in longitudinal alignment with the screw 31 in the jaw member 28, as shown in Figures 2 and 3. The guide pin 38 and the pin 44 are made of suitable steel the better to serve their use. An auxiliary spring 46 is mounted between the members 28 and 30 and over the stud 41. By this arrangement the jaw members 28 and 30 are yieldably held in spaced and juxta-articular relation limited by the bolt 32 and the nut 33, as adjusted.

Each of the jaw members 28 and 30 are provided at their outer ends with a notch 48 and a hole 49 opening into said notch. The notch 48 is adapted to receive either a face plate 50 which is made of copper and attached directly to the member 28, or the face plate 51 which is made of steel and provided with a base 55 of insulating material. The face plate 50 is attached directly to the jaw member 28 by a suitable cap screw 53 extending through the hole 49 and into a threaded hole 47 in the bottom thereof, as best shown in Figure 4. The steel face plate 51 with its base 55 of insulating material is held in place by a suitable cap screw 53, which is insulated by a suitable bushing (not shown) and by the insulating washer 55.

The face plate 50 which is made of copper and is provided with a transverse groove 52 for seating a rod 64 (Figure 6) or the like to prevent lateral movement. Other adaptations of similar aim may be provided as desired for articles of different cross sections, as will be readily understood. The face plate 51 is provided with a plurality of serrations 56 to prevent longitudinal movement during the welding operation, as best shown in Figure 3.

A suitable water tube 57, shown in Figure 5, is provided within each of the jaw members 28 and 30, which extends parallel with and forwardly of the hinge pin 25, and communicates adjacent its ends with lateral passageways 58 terminating in a threaded opening. The upper opening is provided with a sidewardly projecting hose connection 60 for connection to a suitable water supply; or, if desired, it may be used as a discharge line. The lower openings are each provided with an elbow 61 facing rearwardly and are equipped with a suitable hose connection 60 and hose clamp 62. The arrangement is such that a connecting hose (not shown) may be connected at its ends to the lower lateral connections, providing a passageway between the jaw members 28 and 30. By this arrangement water may be passed through the tubes to carry away excessive heat developed in the welding process.

When in use with a spot welding machine, such as shown in Figure 1, a unit 16 is mounted on the lower or stationary electrode 13 with its jaw members 28 and 30 arranged to swing convergingly on each of the hinge pins 25 and yieldably held in spaced and aligned relation by the combined action of the guide pin 38 and its projecting stud 41 with the conical seat 42, and yieldably held by the coil springs 36 and 46. When thus mounted the copper face plate 50 and the insulated steel face plate 51 are arranged at substantially the same level in spaced relation.

Another unit 16 of similar size and structure is cooperatively mounted on the vertically movable electrode 14 in reverse position to the companion unit 16 carried by the stationary electrode 13. The arrangement is such that each of the copper face plates 50—50 will be in vertically spaced alignment with an insulated face plate 51. When the upper electrode is moved downwardly by the operator, which in this instance is by a foot treadle (not shown) the jaws 28 and 30 grip the parts to be butt welded between a copper face plate 50 and its adjacent insulated serrated plate 51 of the other unit. The action is such that after gripping, the angularity of the swing of jaws 28 and 30 causes them to swing toward each other, bringing the parts to be welded into butted position. In this position the electric current passes through the copper face plates to complete the weld, the current being controlled by a timer or pass-through switch. It is also to be noted that the action of the jaws is sustantially that of a horizontal floating action imparted by the downward movement of the upper unit 16, or the conversion of vertical movement to that which is substantially horizontal.

While I have illustrated and described a practical embodiment of the invention, this is capable of variations and modifications in the combinations and arrangements of parts without departing from the reality of the invention. I therefore do not wish to be limited to the precise details set forth but desire to avail myself of such changes and alterations as may fall within the spirit and scope of the following drawings.

I claim:

1. A device of the class described comprising a body; a shank formed integrally with said body; outwardly projecting arms forming part of said body and projecting outwardly from the base of said shank from opposite sides thereof; outwardly projecting lugs in spaced relation at the outer and inner ends of said arms; hinge pins mounted in and through said lugs; a jaw pivoted on each of said hinge pins adapted to swing in cooperative alignment with each other; means for yieldably holding the free ends of said jaws in juxta-articular relation; a copper face plate mounted on one of said jaws at its forward end; a face plate having transverse serrations on its outer side mounted on the companion jaw member; means for electrically insulating said last mentioned face plate from said jaw; and guiding means directing the movement of said jaws convergingly into close proximity.

2. A device of the class described comprising a body, a plurality of jaws; means for pivotally mounting said jaws to said body on the same plane in equi-distant and equi-angular relation; outwardly directed gripping faces on each of said jaws; and means for holding said gripping faces in co-operative alignment.

3. The construction specified in claim 2 in which mechanical means are provided for adjustably limiting the said jaws to a definite range of movement relative to each other.

4. The construction specified in claim 2 in which the means for holding said gripping faces in co-operative alignment comprises a sliding pin member supported between two of said jaws.

5. The construction specified in claim 2 in which the means for holding said gripping faces in co-operative alignment comprises a yieldingly held sliding pin.

6. The construction specified in claim 2 in which the said gripping faces are projected forwardly and outwardly of said pivotally mounting of said jaws to said body.

7. The construction specified in claim 2 in which one of said gripping faces mounted on one of said jaws is an electrical conductor, and the gripping face on the jaw in co-operative alignment with said first named jaw is electrically insulated from its respective supporting jaw.

8. The construction specified in claim 2 in which each of said jaws is provided with a cavity or water tube adjacent its pivotal mounting having an inlet and an outlet, the outlet of one jaw in communication with the inlet of its companion jaw through flexible tubular means, the inlet of one jaw member being arranged and adapted to be connected to a source of cooling fluid and the outlet of its companion jaw member adapted to be connected to a discharge tubing.

9. A welding clamp unit of the class described comprising a body; means for mounting said body in operative position on a welding machine; pivotal means carried in angular relation to said mounting means; and a gripping jaw hingedly mounted at one of its ends to said pivotal means.

10. The construction specified in claim 9 in which the said pivotal means is arranged in angular relation to said gripping jaw.

11. The construction specified in claim 9 in which the said gripping jaw is pivotally mounted in angular relation to the axial line of said mounting means; and the face of said gripping jaw is arranged substantially at right angle to said axial line of said mounting means.

LLOYD TALBOT.

REFERENCES CITED

The following references are of record in the file of this patent:

UNITED STATES PATENTS

| Number | Name | Date |
| --- | --- | --- |
| 347,140 | Thomson | Aug. 10, 1896 |
| 2,015,184 | Hopkins | Sept. 24, 1935 |
| 2,288,693 | Fotie | July 7, 1942 |
| 2,401,359 | Lilja | June 4, 1946 |